(12) United States Patent
Liu et al.

(10) Patent No.: US 10,756,399 B2
(45) Date of Patent: Aug. 25, 2020

(54) BATTERY MODULE

(71) Applicant: Microvast Power Systems Co., Ltd., Zhejiang (CN)

(72) Inventors: Shaosong Liu, Zhejiang (CN); Wenjuan Liu Mattis, Zhejiang (CN); Shengxian Wu, Zhejiang (CN)

(73) Assignee: Microvast Power Systems Co., Ltd., Zhejiang (CN)

( * ) Notice: Subject to any disclaimer, the term of this patent is extended or adjusted under 35 U.S.C. 154(b) by 0 days.

(21) Appl. No.: 16/129,765

(22) Filed: Sep. 12, 2018

(65) Prior Publication Data
US 2019/0081373 A1 Mar. 14, 2019

(30) Foreign Application Priority Data
Sep. 14, 2017 (CN) ...................... 2017 2 1178080 U

(51) Int. Cl.
*H01M 10/6554* (2014.01)
*H01M 10/6551* (2014.01)
*H01M 10/647* (2014.01)
*H01M 10/613* (2014.01)
*H01M 10/653* (2014.01)
*H01M 10/6556* (2014.01)
*H01M 10/6555* (2014.01)

(52) U.S. Cl.
CPC ..... *H01M 10/6554* (2015.04); *H01M 10/613* (2015.04); *H01M 10/647* (2015.04); *H01M 10/653* (2015.04); *H01M 10/6551* (2015.04); *H01M 10/6555* (2015.04); *H01M 10/6556* (2015.04)

(58) Field of Classification Search
None
See application file for complete search history.

(56) References Cited

U.S. PATENT DOCUMENTS 7,572,549 B2 * 8/2009 Wegner ............... H01M 2/0212
165/43

FOREIGN PATENT DOCUMENTS

| CN | 205882126 U | 1/2017 |
| EP | 3133668 A1 | 2/2017 |
| EP | 3163673 A1 | 5/2017 |

* cited by examiner

*Primary Examiner* — Wyatt P McConnell
(74) *Attorney, Agent, or Firm* — Gang Yu

(57) ABSTRACT

The disclosure provides a battery module. The battery module includes a battery stacked body, which includes stacked batteries; cooling plates that are installed at the tail ends in a battery stacking direction of the battery stacked body, and the cooling plates and the battery stacked body are installed in a thermal insulation mode; and heat transfer device that are in thermal contact with the cooling plates, and heat of the batteries is transferred to the cooling plates through the heat transfer device; wherein in a normal charging-discharging state, the battery with the highest temperature in the battery stacked body is a battery A; and between a single cooling plate and the battery A, a thermal resistance between each battery and the heat transfer device is reduced along with the increase of a distance between the each battery and the cooling plate in the battery stacking direction.

13 Claims, 6 Drawing Sheets

BATTERY MODULE

TECHNICAL FIELD

The present disclosure relates to a battery module.

BACKGROUND

Along with the increasingly serious energy situation around the world and the continuously enhancement of the environmental awareness of people, the development of new energy vehicles is greatly focused, and the application of lithium ion batteries to electric vehicles has become a research hotspot. Because of the features of the battery, the battery needs to be operated within a suitable temperature range, and excessively high or low temperature not only can affect the battery performance, but also can cause safety problems, so a temperature of the battery needs to be adjusted by cooling or heating.

The battery stacked body includes a plurality of serially and parallelly connected batteries, the temperature of each battery has a certain difference, land the difference of the temperature between the batteries can be enlarged in a degree by a cooling or heating method in a related art. Especially, while a cooling plate is provided at a tail end in a battery stacking direction, the temperature uniformity of the batteries becomes worse in a cooling process, and the battery performance is seriously affected.

SUMMARY

The disclosure provides a battery module, including:

a battery stacked body, wherein the battery stacked body includes a plurality of stacked batteries;

a cooling plate, wherein the cooling plate is provided at a tail end in the battery stacking direction of the battery stacked body, and the cooling plate and the battery stacked body are provided in a thermal-insulating manner; and a heat transfer device, wherein the heat transfer device is in thermal contact with the cooling plate, and heat of the batteries is transferred to the cooling plate through the heat transfer device;

wherein in a normal charging-discharging state, a battery with a highest temperature in the battery stacked body is a battery A; and between a single cooling plate and the battery A, a thermal resistance between each battery and the heat transfer device is reduced along with an increase of a distance between the each battery and the cooling plates in the battery stacking direction.

The stacking direction of the batteries of the battery stacked body is a same as a thickness direction of each battery.

The cooling plate and the battery stacked body are provided in the thermal-insulating manner, namely the cooling plate are not in thermal contact with the battery stacked body directly, and the heat transfer between the cooling plate and the battery stacked body is performed through the heat transfer device.

The heat transfer device is a heat-transferring (heat-conducting) device, and can be a heat-conducting metal piece, for example: various shapes of metal plates, such as an L-shaped metal plate and a U-shaped metal plate; and can be a heat-conducting device, such as a heat tube, a heat-conducting film or a metal cooling plate with a cooling medium.

In a normal charging-discharging (working) state, a battery with a highest temperature in the battery stacked body is a battery A, namely in the normal charging-discharging state, under the conditions without adopting cooling measures or the original cooling conditions, the battery with the highest temperature in the battery stacked body is the battery A.

The battery A is a battery determined by experience or actual measurement. Generally, the battery A is a battery positioned at a central position of the battery stacked body.

In some embodiments of the disclosure, the battery stacked body includes heat-conducting fins, each battery is at least in thermal contact with one heat-conducting fin, and the heat-conducting fins are in thermal contact with the heat transfer device.

The thermal contact is a direct contact aiming to conduct heat or an indirect contact (such as: an indirect contact mode of providing heat-conducting glue between the contact surfaces) aiming to adjust thermal resistance.

The heat-conducting fins conduct the heat of the batteries to the heat transfer device, and the heat transfer device transfers the heat to the cooling plate.

In some embodiments of the disclosure, between the single cooling plate and the battery A, a thickness of each heat-conducting fin is increased along with an increase of a distance between the each heat-conducting fin and the cooling plate in the battery stacking direction.

In some embodiments of the disclosure, between the single cooling plate and the battery A, a thermal contact area between each battery and the corresponding heat-conducting fin is enlarged along with an increase of a distance between the each battery and the cooling plate in the battery stacking direction.

The thermal contact area between the battery and the heat-conducting fin is a sum of the thermal contact areas between the battery and the heat-conducting fin in thermal contact with the battery.

In some embodiments of the disclosure, each of the heat-conducting fin is provided with at least one through hole; and between the single cooling plate and the battery A, a total cross-sectional area of the at least one through hole in each heat-conducting fin is reduced along with an increase of a distance between the each heat-conducting fin and the cooling plate in the battery stacking direction.

In some embodiments of the disclosure, each of the heat-conducting fins is provided with a bending portion, and is in thermal contact with the heat transfer device through the bending portion; and between the single cooling plate and the battery A, the thermal contact area between the bending portion of each heat-conducting fin and the heat transfer device is enlarged along with an increase of a distance between the each heat-conducting fin and the cooling plate in the battery stacking direction.

In some embodiments of the disclosure, each of the bending portions is provided with at least one through hole; and between the single cooling plate and the battery A, a total cross-sectional area of the at least one through hole in the bending portion of each heat-conducting fin is reduced along with the increase of the distance between the each heat-conducting fin and the cooling plate in the battery stacking direction.

The at least one through hole in each bending portion is provided at a part, in thermal contact with the heat transfer device, of the bending portion, and the thermal contact area between the bending portion and the heat transfer device can be reduced by providing the at least one through hole.

In some embodiments of the disclosure, one side, in thermal contact with the heat transfer devices, of the bending portion is provided with a groove, and the groove is not in thermal contact with the heat transfer device; and between the single cooling plate and the battery A, a total area of the grooves at one side, in thermal contact with the heat transfer device, of the bending portion of each heat-conducting fin is reduced along with an increase of a distance between the each heat-conducting fin and the cooling plate in the battery stacking direction.

The groove in the bending portion is provided at a part, in thermal contact with the heat transfer device, of the bending portion, and the thermal contact area between the bending portion and the heat transfer device can be reduced by installing the groove.

In some embodiments of the disclosure, the batteries comprised in the battery stacked body are stacked in a vertical direction.

The batteries comprised in the battery stacked body are stacked in the vertical direction, so a height arrangement of the battery stacked body is more flexible in the vertical direction.

In an exemplary embodiment of the disclosure, there are two heat transfer devices, and the heat transfer devices are respectively provided at two opposite sides of the battery stacked body.

Each heat-conducting fin is provided with the bending portions at both sides of the battery stacked body provided with the heat transfer devices, and each bending portion is in thermal contact with the heat transfer device closest to the bending portion; and the two heat transfer devices are in thermal contact with the cooling plate.

In an exemplary embodiment of the disclosure, the cooling plate is provided with a liquid inlet and a liquid outlet.

A cooling medium enters and exits a cavity in the cooling plate through the liquid inlet and the liquid outlet and takes away the heat transferred to the cooling plate.

In an exemplary embodiment of the disclosure, two tail ends of the battery stacked body in the battery stacking direction are provided with the cooling plates.

The two cooling plates at the tail ends are in thermal contact with the heat transfer devices, so that cooling capacity is further provided, and the cooling functions to the heat transfer devices and the battery stacked body are enhanced.

In an exemplary embodiment of the disclosure, a thermal-insulating layer is provided between the cooling plate and the battery stacked body.

The thermal-insulation setting between the cooling plate and the battery stacked body is realized by installing the thermal-insulating layer, the thermal-insulating layer may avoid direct thermal contact between the battery stacked body and the cooling plate, and prevent excessive temperature difference between the battery closest to the cooling plate and other batteries.

In an exemplary embodiment of the disclosure, the thermal-insulating layer is an aerogel thermal-insulating pad.

The cooling plates may cool the battery stacked body, for example: the cooling plate is filled with a cooling liquid; on the other hand, the cooling plate may also provide the heat for heating the battery stacked body, for example: the cooling plate is filled with liquid in higher temperature.

In an exemplary embodiment of the disclosure, a heat-conducting material (such as: heat-conducting silica gel) is provided between each of the batteries and each of the heat-conducting fins, and between the single cooling plate and the battery A, a thickness of the heat-conducting material is reduced along with an increase of a distance between the heat-conducting material and the cooling plate in the battery stacking direction.

In an exemplary embodiment of the disclosure, each of the heat-conducting fins is provided with a protruded part, the protruded part is in thermal contact with the battery, and between the single cooling plate and the battery A, the thermal contact area between the protruded parts and the batteries is enlarged along with an increase of a distance between the heat-conducting fins and the cooling plate in the battery stacking direction.

In an exemplary embodiment of the disclosure, the heat transfer device is provided with a bulge or a groove, the thermal contact area between the heat transfer device and the heat-conducting fin is changed by the bulge or the groove, so between the single cooling plate and the battery A, the thermal contact area between the bending portions of the heat-conducting fins and the heat transfer device is enlarged along with the increase of the distance between the heat-conducting fins and the cooling plate in the battery stacking direction.

The disclosure has the following beneficial effects:

1. according to the battery module provided by the disclosure, the cooling plate is provided at a tail end in the battery stacking direction, so multiple battery stacked bodies formed by stacking the batteries in the vertical direction may use a same cooling plate, and the structure of the battery module is simplified;

2. according to the battery module provided by the disclosure, between the single cooling plate and the battery A, the thermal resistance between each battery and the heat transfer device is reduced along with the increase of the distance between each battery and the cooling plate in the battery stacking direction; at the same time, because the thermal resistance between each position on the heat transfer device and the cooling plate is increased along with the increase of a distance between the position and the cooling plate in the battery stacking direction, finally each battery between the single cooling plate and the battery A can be cooled by the same cooling plate, the temperatures of the batteries tend to be consistent, and the temperature equalization of each battery is conveniently realized.

DESCRIPTION OF DRAWING MARKS

1: cooling plate, 11: liquid inlet, 12: liquid outlet, 2: heat transfer device, 3: heat-conducting fin, 31: bending portion, 4: batteries, 40: battery A, 5: thermal-insulating layer.

DETAILED DESCRIPTION OF THE EMBODIMENTS

The disclosure is described in detail by the following embodiments, and the disclosure is not limited to the following embodiments.

Embodiment 1

Figure 1:
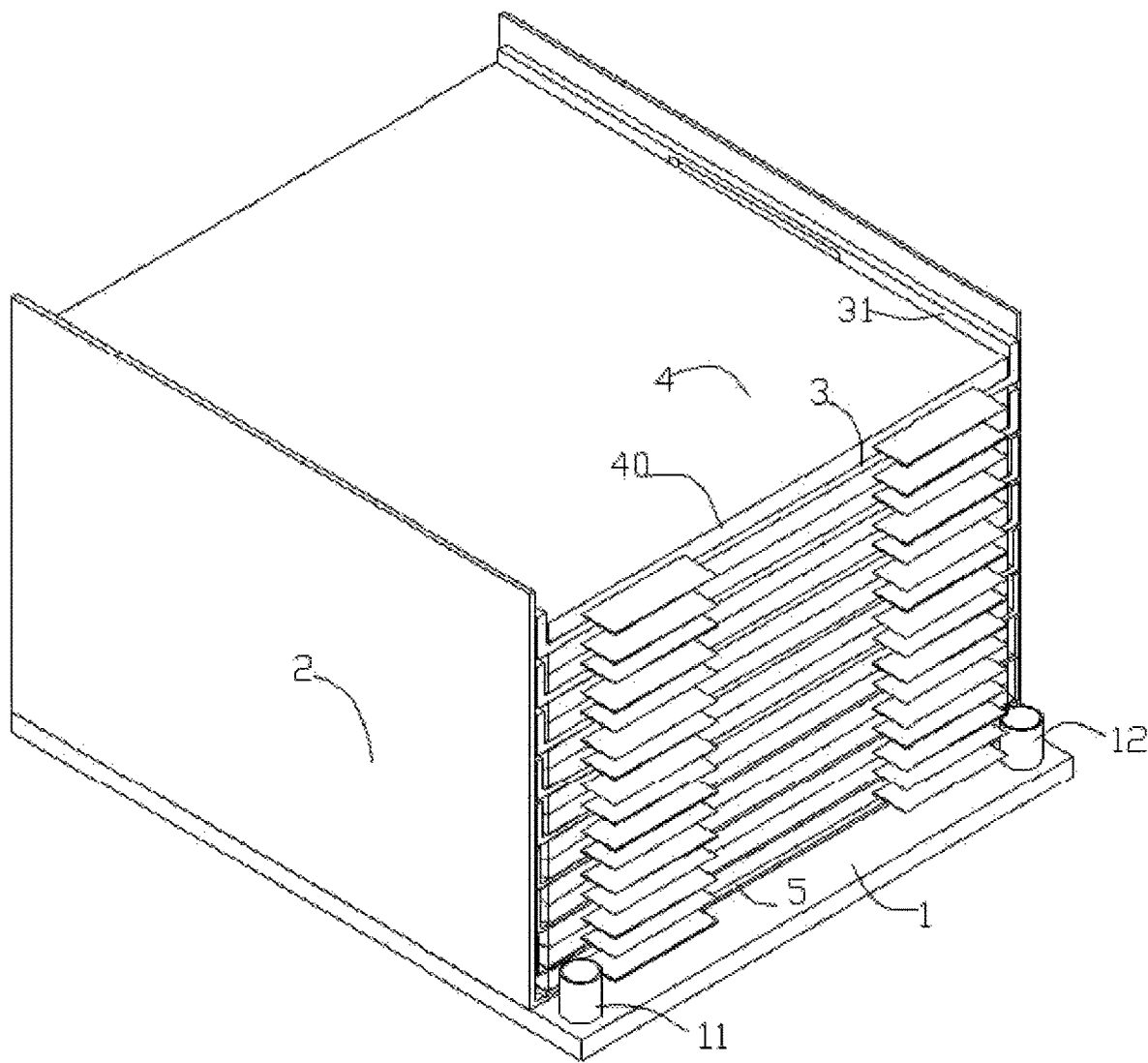
FIG. 1 is an isometric schematic diagram of a battery module.

As shown in FIG. 1, an embodiment of the disclosure provides a battery module, which includes a battery stacked body, a cooling plate 1 and a heat transfer device 2.

The battery stacked body includes heat-conducting fins 3 and stacked batteries 4, the batteries 4 comprised in the battery stacked body are stacked in a vertical direction; and the heat-conducting fins 3 are provided between the stacked batteries 4, and each battery 4 is at least in thermal contact with one heat-conducting fin 3; and the heat-conducting fins 3 are made of aluminum.

One tail end (a bottom of the battery stacked body) in the stacking direction of the batteries 4 of the battery stacked body is provided with the cooling plate 1, and the cooling plate 1 is provided with a liquid inlet 11 and a liquid outlet 12; and a thermal-insulating layer 5 is provided between the cooling plate 1 and the battery stacked body, and the thermal-insulating layer 5 is an aerogel thermal-insulting pad.

The heat transfer device (metal plate) 2 is in thermal contact with the cooling plate 1 and the heat-conducting fins 3; the heat of the batteries 4 is transferred to the cooling plate 1 through the heat-conducting fins 3 and the heat transfer device 2 successively; in some embodiments of the present disclosure, there are two heat transfer devices 2, and the heat transfer devices 2 are respectively provided at two opposite sides of the battery stacked body.

Figure 2:
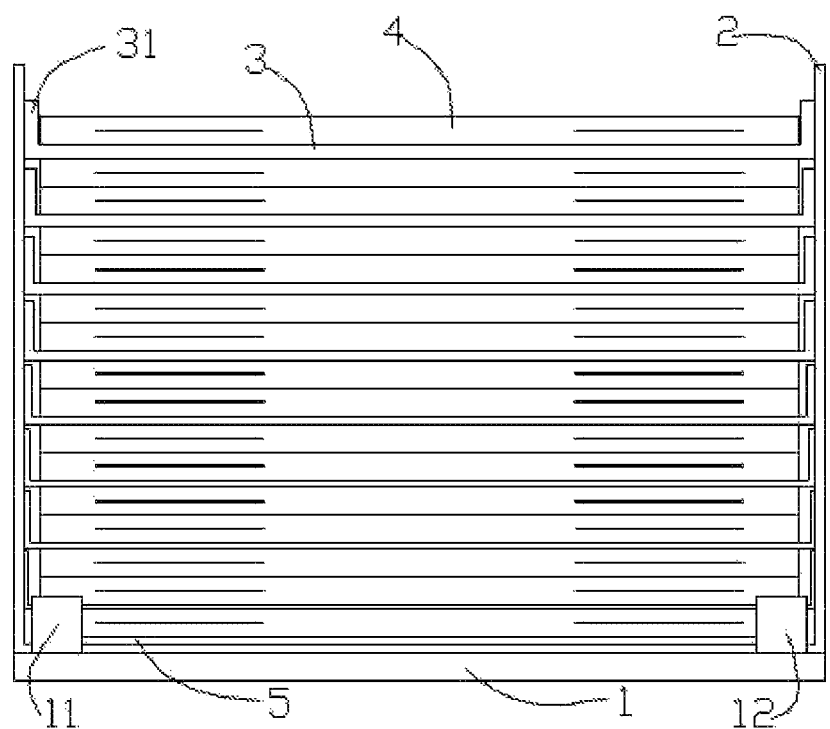
FIG. 2 is a front view schematic diagram of a battery module.
Figure 3:
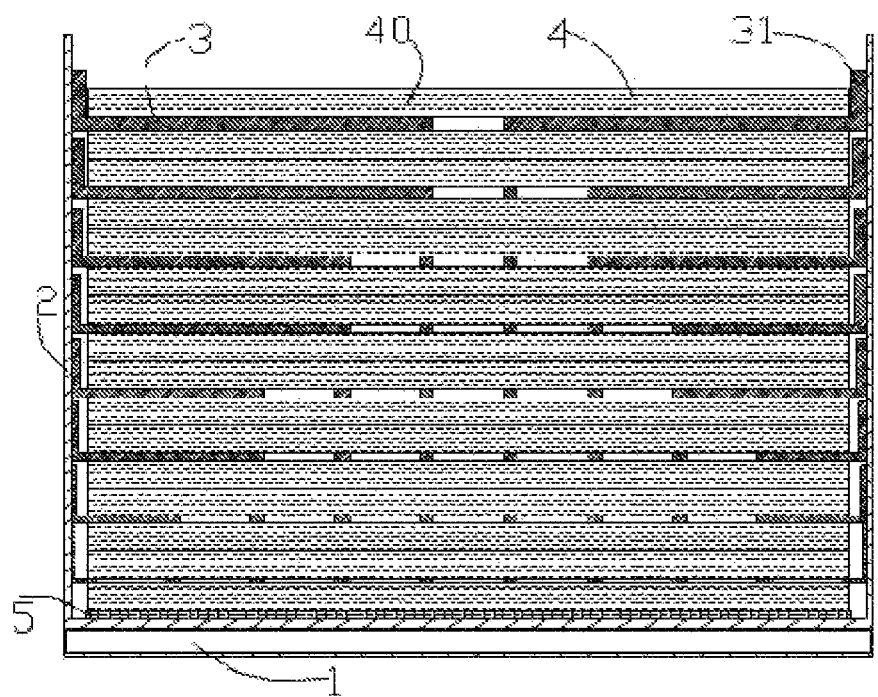
FIG. 3 is a section view schematic diagram of a battery module.

As shown in FIG. 2 and FIG. 3, in the normal charging-discharging state, a battery with a highest temperature of the battery stacked body is a battery A 40; and between the single cooling plate 1 and the battery A 40, a thermal resistance between each battery 4 and the heat transfer device 2 is gradually reduced along with the increase of a distance between each battery 4 and the cooling plate 1 in the battery stacking direction.

Between the single cooling plate 1 and the battery A 40, a thickness of each heat-conducting fin 3 is gradually increased along with an increase of a distance between each heat-conducting fin 3 and the cooling plate 1 in the battery stacking direction.

Figure 4:
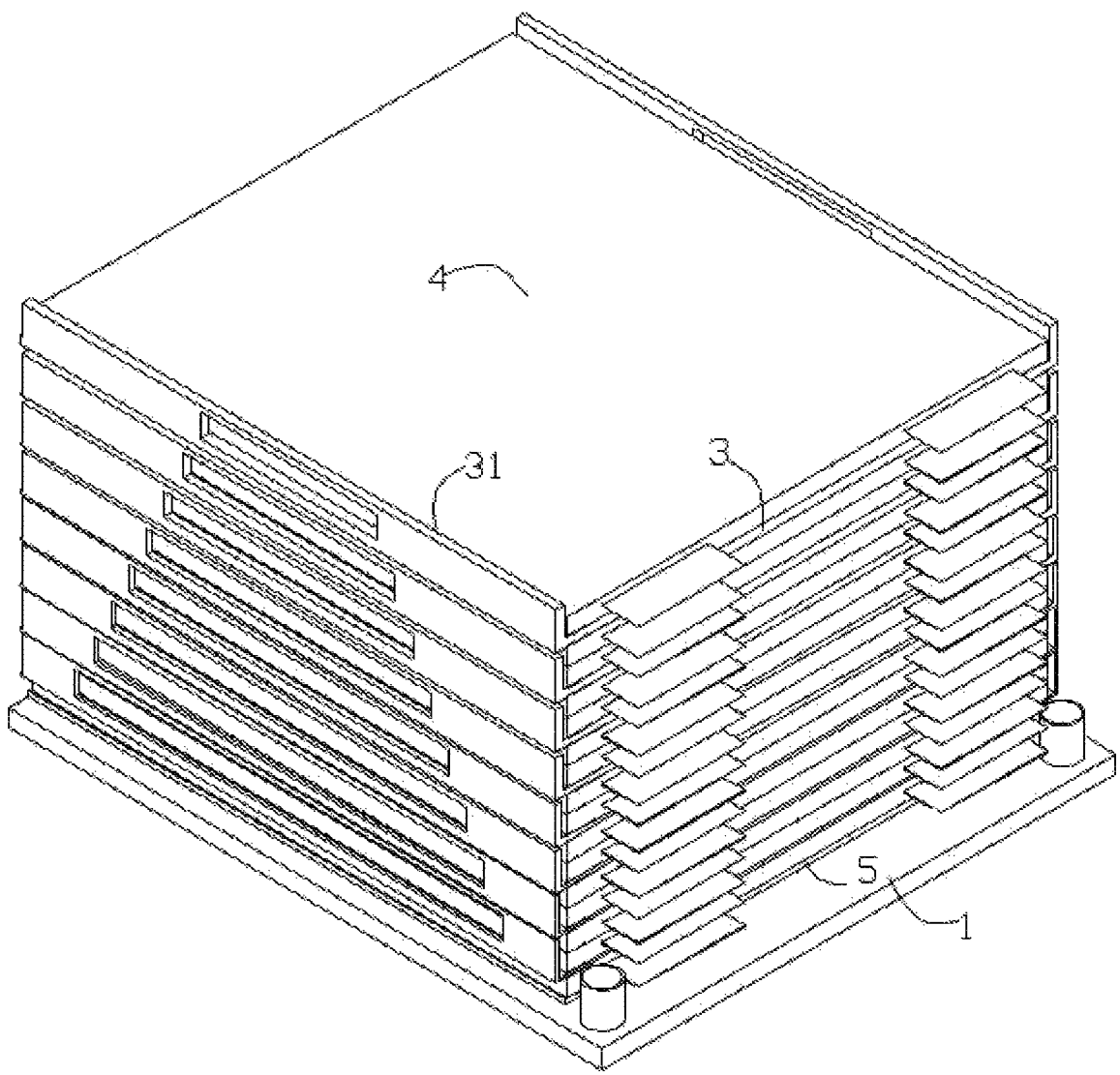
FIG. 4 is a perspective view schematic diagram of a battery module.

As shown in FIG. 3 and FIG. 4, the heat-conducting fins 3 are provided with bending portions 31, the heat-conducting fins 3 are in thermal contact with the heat transfer device 2 through the bending portions 31; and between the single cooling plate 1 and the battery A 40, a thermal contact area between the bending portion 31 of each heat-conducting fin 3 and the heat transfer device 2 is gradually enlarged along with the increase of a distance between each heat-conducting fin 3 and the cooling plate 1 in the battery stacking direction. Each of the bending portions 31 is provided with at least one through hole; and between the single cooling plate 1 and the battery A 40, a total cross-sectional area of the at least one through hole in the bending portion 31 of each heat-conducting fin 3 is gradually reduced along with an increase of a distance between each heat-conducting fin 3 and the cooling plate 1 in the battery stacking direction.

Embodiment 2

Figure 5:
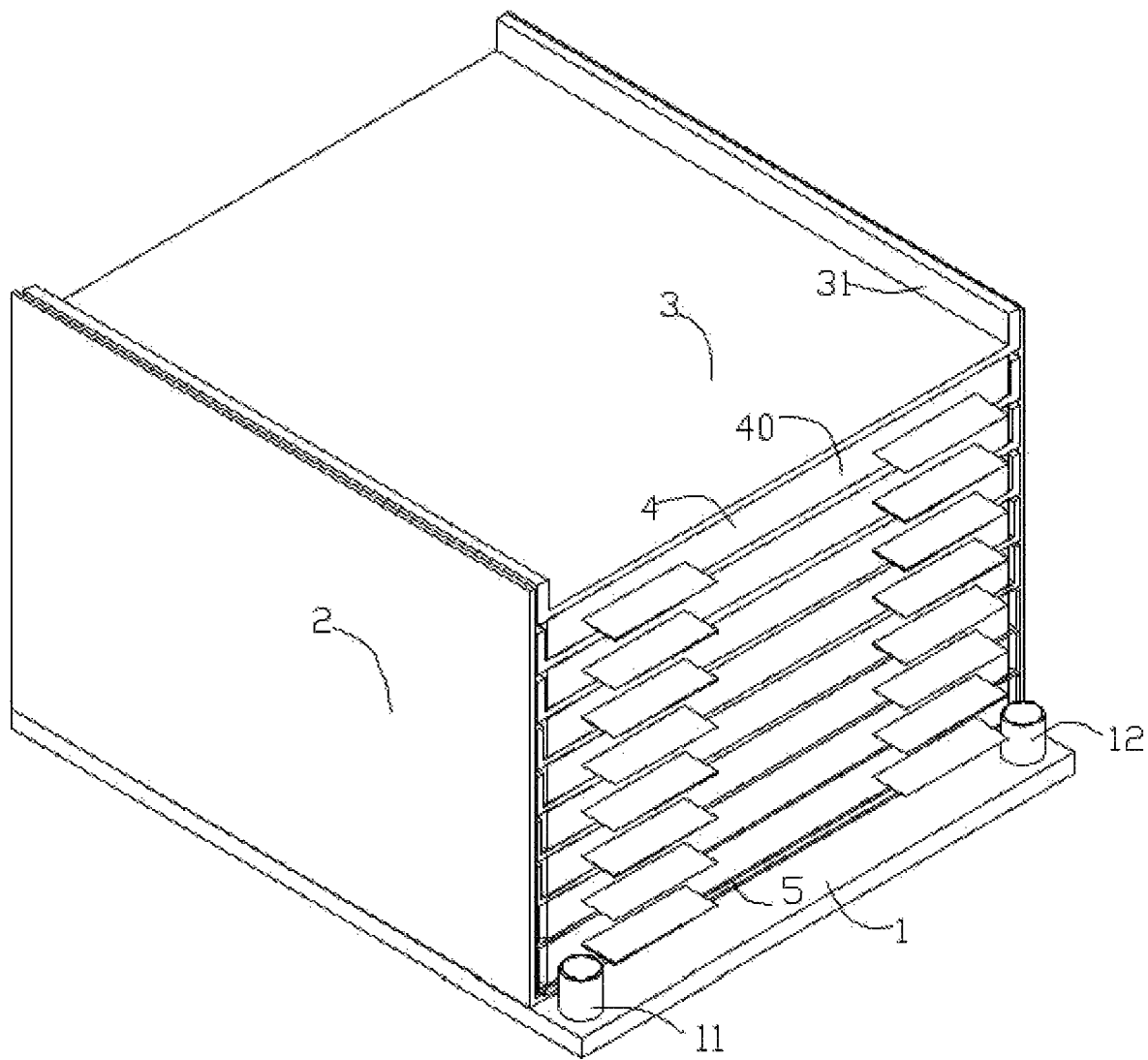
FIG. 5 is an isometric schematic diagram of another embodiment of a battery module.

As shown in FIG. 5, the present disclosure provides a battery module, which includes a battery stacked body, a cooling plate 1 and a heat transfer device 2.

The battery stacked body includes heat-conducting fins 3 and stacked batteries 4, the batteries 4 of the battery stacked body are stacked in a vertical direction; and the heat-conducting fins 3 are provided between the stacked batteries 4, and one battery 4 is provided between arbitrary two adjacent heat-conducting fins 3, and arbitrary one battery 4 is in thermal contact with two heat-conducting fins 3; and the heat-conducting fins 3 are made of aluminum.

One tail end (a bottom of the battery stacked body) in the stacking direction of the batteries 4 in the battery stacked body is provided with the cooling plate 1, and the cooling plate 1 is provided with a liquid inlet 11 and a liquid outlet 12; and the thermal-insulating layer 5 is provided between the cooling plate 1 and the battery stacked body, and the thermal-insulating layer 5 is an aerogel thermal-insulting pad.

The heat transfer device (metal plate) 2 is in thermal contact with the cooling plate 1 and the heat-conducting fins 3; the heat of the batteries 4 is transferred to the cooling plates 1 successively through the heat-conducting fins 3 and the heat transfer device 2.

In some embodiments of the present disclosure, there are two heat transfer devices 2, and the heat transfer devices 2 are respectively provided at two opposite sides of the battery stacked body.

In a normal charging-discharging state, a battery with a highest temperature in the battery stacked body is a battery A 40; and between the single cooling plate 1 and the battery A 40, a thermal resistance between each battery 4 and the heat transfer devices 2 is gradually reduced along with the increase of a distance between each battery 4 and the cooling plate 1 in the battery stacking direction.

Figure 6:
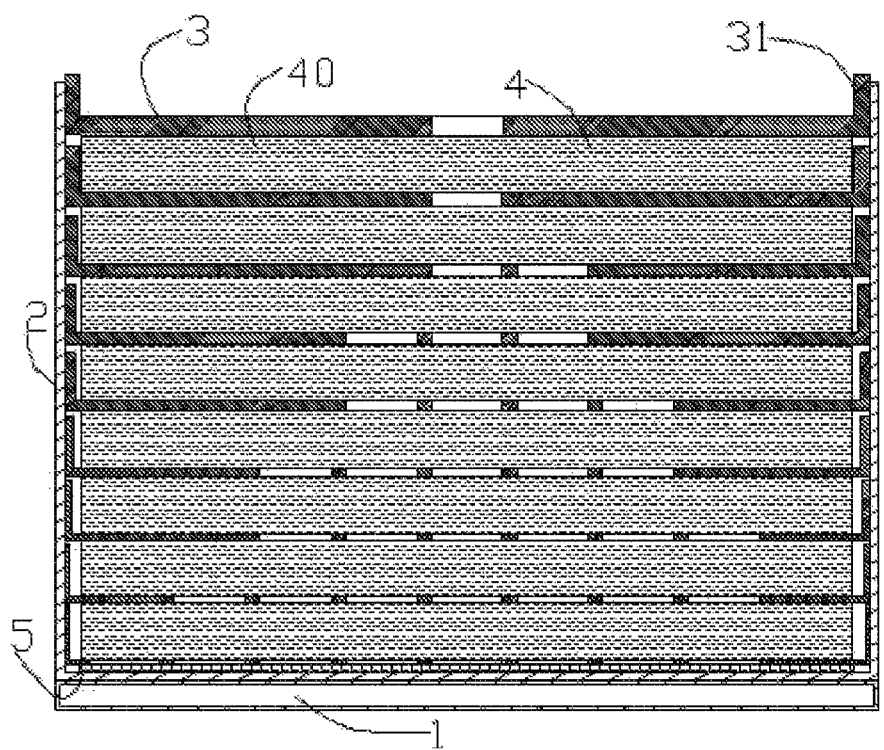
FIG. 6 is a section view schematic diagram of another embodiment of a battery module.

As shown in FIG. 6, between the single cooling plate 1 and the battery A 40, a thermal contact area between each battery 4 and the heat-conducting fins 3 is gradually enlarged along with the increase of the distance between each battery 4 and the cooling plate 1 in the battery stacking direction. In an exemplary embodiment, each of the heat-conducting fins 3 is provided with at least one through hole; and between the single cooling plate 1 and the battery A 40, a total cross-sectional area of the at least one through holes of each heat-conducting fin 3 is gradually reduced along with the increase of the distance between the each heat-conducting fin 3 and the cooling plate 1 in the battery stacking direction.

In another embodiment (not shown in the figure), similar to embodiment 1 that the bending portions 31 are provided with the at least one through hole, one side, in thermal contact with the heat transfer device 2, of each bending portion 31 is provided with a groove, and the groove is not in thermal contact with the heat transfer device 2; and between the single cooling plate 1 and the battery A 40, the total area of the groove at one side, in thermal contact with the heat transfer device 2, of the bending portion 31 of each heat-conducting fin 3 is gradually reduced along with the increase of the distance between each heat-conducting fin 3 and the cooling plate 1 in the battery stacking direction; and two tail ends in the battery stacking direction of the battery stacked body are provided with the cooling plates 1.

Figure 7:
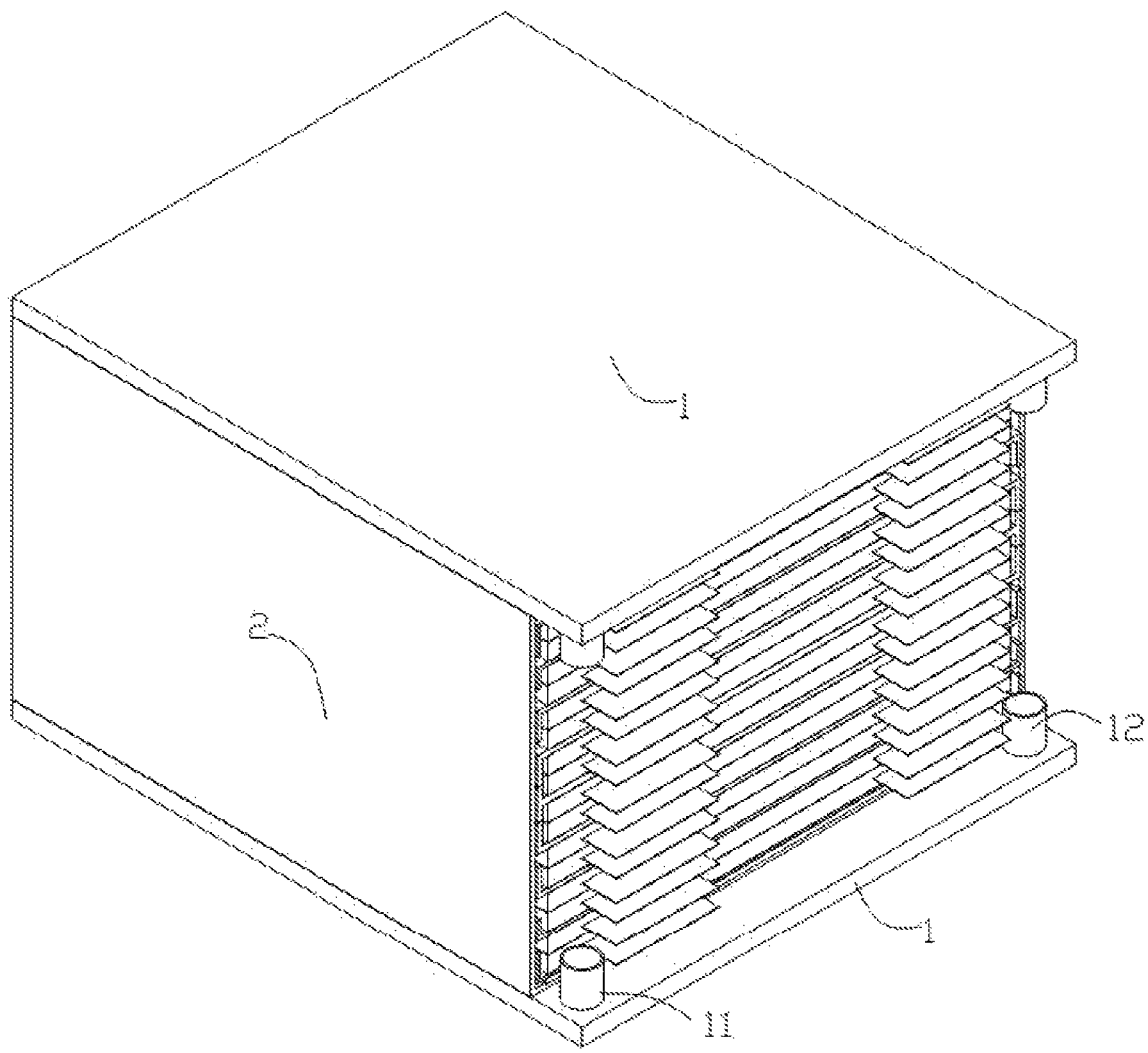
FIG. 7 is a structure schematic diagram of an alternative embodiment of a battery module (wherein, two cooling plates are shown).

In an exemplary embodiment, as shown in FIG. 7, a battery module includes a battery stacked body, two cooling plates 1 and a heat transfer device 2.

The above are merely some exemplary implementation modes of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

What is claimed is:

1. A battery module, comprising:
a battery stacked body, wherein the battery stacked body comprises a plurality of stacked batteries;
a cooling plate, wherein the cooling plate is provided at a tail end in a battery stacking direction of the battery stacked body, and the cooling plate and the battery stacked body are provided in a thermal insulation manner; and
a heat transfer device, wherein the heat transfer device is in thermal contact with the cooling plate, and heat of the batteries is transferred to the cooling plate through the heat transfer device;
wherein in a working state, a battery with a highest temperature in the battery stacked body is a battery A; and between the cooling plate and the battery A, as a distance between each of the plurality of batteries and the cooling plate in the battery stacking direction is increased, a thermal resistance between the each of the plurality of batteries and the heat transfer device is reduced.

2. The battery module as cl aimed in claim 1, wherein the battery stacked body further comprises heat-conducting fins, each battery at least contacts with one heat-conducting fin, and the heat-conducting fins are in thermal contact with the heat transfer device.

3. The battery module as claimed in claim 2, wherein between the cooling plate and the battery A, a distance between each of the heat-conducting fins and the cooling plate in, the battery stacking direction is increased, a thickness of the each of the heat-conducting fins is increased.

4. The battery module as claimed in claim 2, wherein between the cooling plate and the battery A, as a distance between the each of the plurality of batteries and the cooling plate in the battery stacking direction is increased, a thermal contact area between the each of the plurality of batteries and a corresponding heat-conducting fin in the heat-conducting fins is enlarged.

5. The battery module as claimed in claim 2, wherein each of the heat-conducting fins is provided with at least one through hole; and between the cooling plate and the battery A, as a distance between the each of the heat-conducting fins and the cooling plate in the battery stacking direction is increased, a total cross-sectional area of the at least one through hole in the each of the heat-conducting fins is reduced.

6. The battery module as claimed in claim 2, wherein each of the heat-conducting fins is provided with a bending portion, and is in thermal contact with the heat transfer device through the bending portion; and between the cooling plate and the battery A, as a distance between the each of the heat-conducting fins and the cooling plate in the battery stacking direction is increased, a thermal contact area between the bending portion of the each of the heat-conducting fins and the heat transfer device is enlarged.

7. The battery module as claimed in claim 6, wherein the bending portion is provided with at least one through hole; and between the cooling plate and the battery A, as a distance between the each of the heat-conducting fins and the cooling plate in the battery stacking direction is increased, a total cross-sectional area of the at least one through hole in the bending portion of the each of the heat-conducting fins is reduced.

8. The battery module as claimed in claim 6, wherein one side, in thermal contact with the heat transfer device, of the bending portion is provided with a groove, and the groove is not in thermal contact with the heat transfer device; and between the cooling plate and the battery A, in the battery stacking direction, as a distance between the each of the heat-conducting fins and the cooling plate is increased, a total area of the groove at the side, in thermal contact with the heat transfer device, of the bending portion of the each of the heat-conducting fins is reduced.

9. The battery module as claimed in claim 1, wherein the batteries comprised in the battery stacked body are stacked in a vertical direction.

10. The battery module as claimed in claim 1, wherein there are two heat transfer devices, and the heat transfer devices are respectively provided at two opposite sides of the battery stacked body.

11. The battery module as claimed in claim 1, wherein the cooling plate is provided with a liquid inlet and a liquid outlet.

12. The battery module as claimed in claim 1, wherein two tail ends of the battery stacked body in the battery stacking direction are provided with the cooling plate.

13. The battery module as claimed in claim 1, wherein a thermal-insulating layer is provided between the cooling plate and the battery stacked body.

* * * * *